United States Patent
Cohen et al.

(10) Patent No.: US 10,599,506 B2
(45) Date of Patent: Mar. 24, 2020

(54) METHODS AND SYSTEMS FOR IDENTIFYING ACTION FOR RESPONDING TO ANOMALY IN CLOUD COMPUTING SYSTEM

(75) Inventors: Ira Cohen, Modiin (IL); Ohad Assulin, Yehud (IL); Eli Mordechai, Modiin (IL); Refael Dakar, Yehud (IL)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1312 days.

(21) Appl. No.: 14/350,639

(22) PCT Filed: Oct. 10, 2011

(86) PCT No.: PCT/US2011/055614
§ 371 (c)(1),
(2), (4) Date: Aug. 4, 2014

(87) PCT Pub. No.: WO2013/055311
PCT Pub. Date: Apr. 18, 2013

(65) Prior Publication Data
US 2014/0372347 A1   Dec. 18, 2014

(51) Int. Cl.
*G06N 20/00* (2019.01)
*G06F 11/07* (2006.01)
*G06F 11/30* (2006.01)

(52) U.S. Cl.
CPC ........ *G06F 11/079* (2013.01); *G06F 11/0709* (2013.01); *G06F 11/0793* (2013.01); *G06F 11/302* (2013.01); *G06F 11/3006* (2013.01); *G06F 11/3072* (2013.01); *G06N 20/00* (2019.01); *G06F 11/0751* (2013.01)

(58) Field of Classification Search
CPC ............................. G06N 99/005; G06F 11/079
See application file for complete search history.

(56) References Cited

U.S. PATENT DOCUMENTS 5,463,768 A * 10/1995 Cuddihy ............... G06F 11/079
714/37
2003/0097617 A1   5/2003 Goeller et al.
2004/0059966 A1   3/2004 Chan et al.
(Continued)

FOREIGN PATENT DOCUMENTS

CN   101887392 A   1/2010

OTHER PUBLICATIONS

CA Technologies, "CA Application Performance Management Cloud Monitor," Copyright 2011 CA, 8 p.
(Continued)

*Primary Examiner* — Vincent Gonzales
*Assistant Examiner* — Kevin W Figueroa
(74) *Attorney, Agent, or Firm* — Hewlett Packard Enterprise Patent Department

(57) ABSTRACT

Methods performed by a physical computing system include automatically identifying, using at least one trained classifier, an action for responding to an anomaly in the execution of the application in a cloud computing system. The at least one trained classifier relates a metrics set to a result of performing an action for addressing an anomaly. Systems and computer readable media are also described herein.

20 Claims, 8 Drawing Sheets

(56) References Cited

U.S. PATENT DOCUMENTS

| | | | |
|---|---|---|---|
| 2005/0193281 A1* | 9/2005 | Ide | G06F 11/0709 714/4.1 |
| 2008/0021855 A1* | 1/2008 | Bonabeau | G06N 3/126 706/46 |
| 2008/0244747 A1 | 10/2008 | Gleichauf et al. | |
| 2008/0270077 A1 | 10/2008 | Ozonat et al. | |
| 2009/0265292 A1* | 10/2009 | Harper | G06N 3/126 706/13 |
| 2009/0313699 A1 | 12/2009 | Jang et al. | |
| 2009/0328008 A1 | 12/2009 | Mital et al. | |
| 2010/0125664 A1 | 5/2010 | Hadar et al. | |
| 2011/0060895 A1 | 3/2011 | Solomon | |
| 2011/0087515 A1* | 4/2011 | Miller | G06Q 10/04 705/7.26 |
| 2011/0154109 A1 | 6/2011 | Levine et al. | |
| 2011/0214006 A1 | 9/2011 | Meek et al. | |
| 2011/0238336 A1* | 9/2011 | Di Scalea | G01N 29/043 702/56 |
| 2013/0151166 A1* | 6/2013 | Snyder | G06F 19/34 702/19 |
| 2013/0236082 A1* | 9/2013 | Ribnick | G01N 21/89 382/141 |

OTHER PUBLICATIONS

Copperegg, "RevealCloud Makes Cloud Monitoring Easy.", Copyright 2011, 2 pgs.

Korean Intellectual Property Office, International Search Report and Written Opinion, May 21, 2012, 8 pages, Daejeon Metropolitan City, Republic of Korea.

Netuitive, Inc., "A Transformational Approach to Performance Management for Your Private Cloud," Dec. 2009, 2 p.

Up Time Software, "Cloud Monitoring Easily Report on Cloud Applications, Servers and Services," 3 p. http://www.uptimesoftware.com/cloud-monitoring.php.

VMware, "Application Monitoring for Custom Web Applications," Copyright 2011 VMware, 3 p. http://www.vmware.com/products/vfabric-hyperic/.

* cited by examiner

SIGNATURE 900

| COMPONENT TYPE 902 | COMPONENT INSTANCE 904 | COMPONENT METRIC 906 |
|---|---|---|
| COMPONENT TYPE (1) | INSTANCE(1) | METRIC(1) |
| | | METRIC(2) |
| | | ○ ○ ○ |
| | | METRIC(K) |
| | INSTANCE(2) | METRIC(1) |
| | | METRIC(2) |
| | | ○ ○ ○ |
| | | METRIC(L) |
| | ○ ○ ○ | |
| | INSTANCE(Q) | METRIC(1) |
| | | METRIC(2) |
| | | ○ ○ ○ |
| | | METRIC(M) |
| ○ ○ ○ | | |
| COMPONENT TYPE (J) | INSTANCE(1) | METRIC(1) |
| | | METRIC(2) |
| | | ○ ○ ○ |
| | | METRIC(N) |
| | INSTANCE(2) | METRIC(1) |
| | | METRIC(2) |
| | | ○ ○ ○ |
| | | METRIC(N) |
| | ○ ○ ○ | |
| | INSTANCE(R) | METRIC(1) |
| | | METRIC(2) |
| | | ○ ○ ○ |
| | | METRIC(O) |

Fig. 9

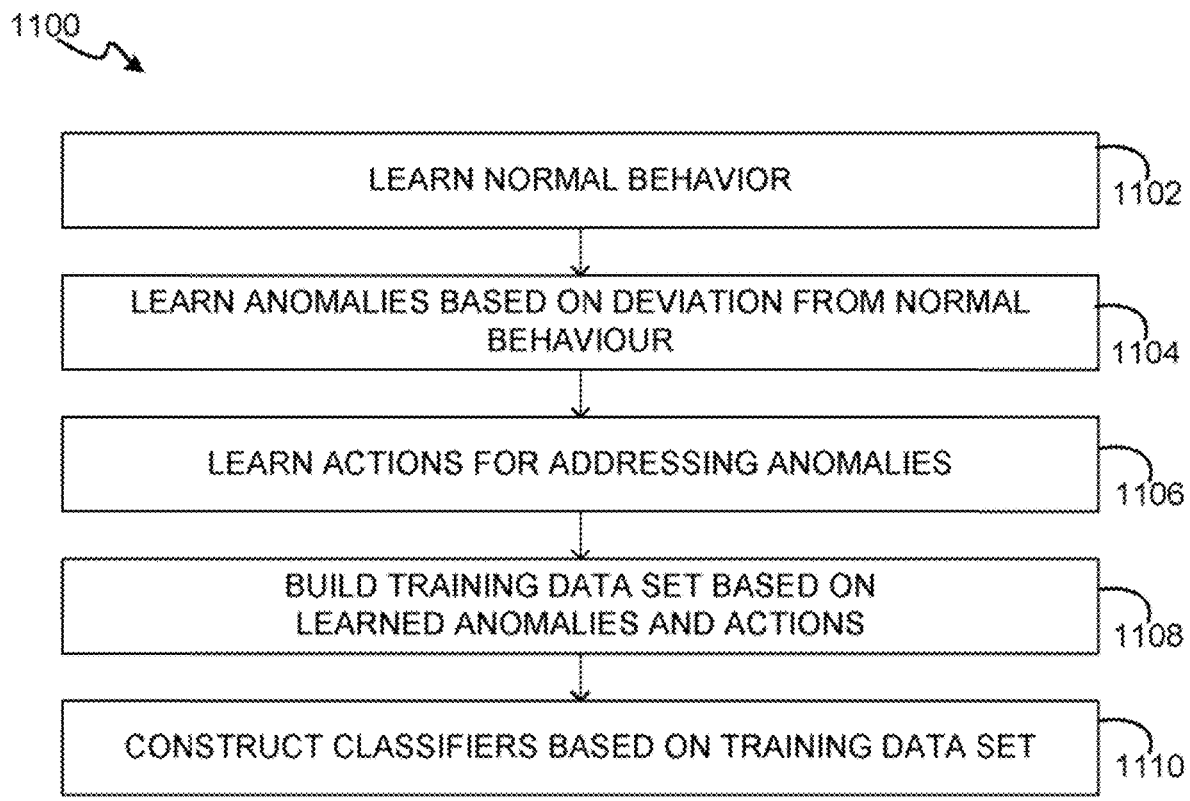

METHODS AND SYSTEMS FOR IDENTIFYING ACTION FOR RESPONDING TO ANOMALY IN CLOUD COMPUTING SYSTEM

BACKGROUND

A cloud computing system is comprised of multiple pieces of hardware interconnected over a network to perform specific computing tasks such as execution of an application. An application is a computer program designed to facilitate carrying out a specific activity. A cloud computing system facilitates scalability of the infrastructure supporting execution of an application. For example, the size and configuration of a hardware virtualization supporting the application may be increased or decreased depending on the computing requirements posed by an execution of the application.

Due to the rather complex nature of cloud computing systems, it may be difficult to (i) determine anomalies affecting an application, and (ii) ascertain solutions to the anomalies. Generally, an automated performance and testing product (e.g., HP LoadRunner, Hewlett-Packard, Palo Alto (Calif.), US) is used for executing an application in a cloud computing system and monitoring the application. An administrator may then evaluate monitored data for (i) determining whether an anomaly affects execution of the application and (ii) guess actions for addressing anomalies. In addition thereto, it has been proposed to implement automatic reaction to performance and correctness problems in a cloud computing environment. However, solving application anomalies during operation is mostly a manual operation.

BRIEF DESCRIPTION OF THE DRAWINGS

The Figures depict examples, implementations, and configurations of the invention, and not the invention itself.

FIGS. 6 to 8, 11 and 12 are flow diagrams depicting steps taken to implement examples.

FIG. 9 is a table illustrating an example of a signature associated with a set of metrics.

FIG. 10 is a table illustrating examples of actions for addressing anomalies.

DETAILED DESCRIPTION

Introduction

Figure 1:
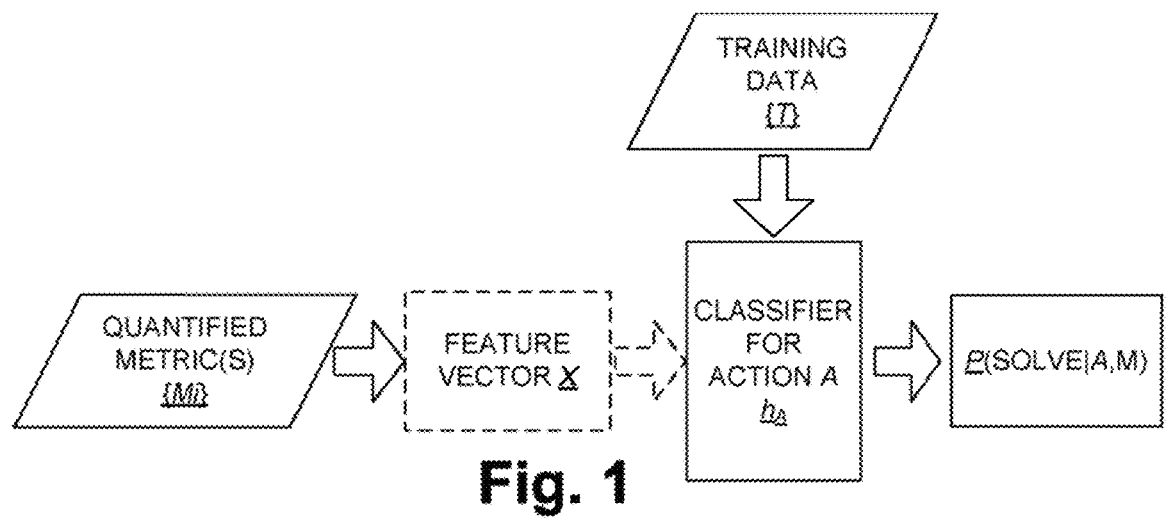
FIG. 1 is a block diagram illustrating a trained classifier according to an example.

In the following description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations.

Various examples herein were developed in an effort for facilitating identifying, using a physical computing system, appropriate actions for addressing an anomaly associated with an execution of an application in a cloud computing system. An application, as used herein, refers to a set of specific instructions executable by a computing system for facilitating carrying out a specific task. For example, an application may take the form of a web-based tool providing users with a specific functionality, e.g., registering to an online service, accessing data related to a product (i.e., browsing), or buying a product. As used herein, a cloud computing system refers to a computing system including multiple pieces of hardware and software operatively coupled over a network and configured such that they can execute a specific computing task.

An example of an implementation includes determining whether a set of quantified metrics corresponds to an anomaly. A quantified metrics in the set is associated with an application execution in a cloud computing system. A set of quantified metrics refers to an aggregate of one or more metrics that are measured or estimated during execution of the application. A metric refers to any measurable feature (or any feature that can be estimated) of resources in a cloud computing system supporting execution of the application. For instance, server response time or pages served per time period are examples of metrics. Other examples include CPU utilization, memory utilization, disk utilization and bandwidth, or queries received/processed by a database. These features, for example, are related to the measured performance of cloud resources. An anomaly may correspond to a deviation of one or more quantified metrics from a normal behavior. The deviation may indicate an abnormal execution of the application. In another example, an anomaly may correspond to a fault or failure of a cloud resource allocated for executing the application. Such fault or failure may be detected by monitoring a log error message associated with the resource.

In some implementations, a set of quantified metrics is collected and converted into a signature representing a state of resources of a cloud computing system executing an application. A signature may be associated with a specific anomaly by including information related to the anomaly in the signature, e.g., a flag indicating which metrics correspond to an abnormal behavior. Signatures may be determined without being related to an anomaly, such as when an application is being executed in a cloud computing system according to a normal behavior. A "normal" signature may be used, for example, to determine, e.g., by comparison with another signature, whether a specific resource state corresponds to an anomaly; another example is for training a classifier that maps a set of quantified metrics to a result of performing an action.

The above example of the implementation further includes, upon determining that a set of quantified metrics corresponds to an anomaly, automatically (i.e., as performed by a physical computing system) identifying, using at least one trained classifier, an action for addressing the anomaly. The trained classifier relates a metric to a result of performing an action for addressing an anomaly. For example, the result associated with the classifier may adopt the values 'solve,' if an action solves an anomaly, or 'not solve,' if the action does not solve the anomaly.

FIG. 1 illustrates a trained classifier $h_A$. Trained classifier $h_A$ for action A is a rule (or 'classifier') such that, given a set of quantified metrics $\{M_i\}$ associated with an anomaly A in the execution of the application, provides a likelihood P that action A solves (or does not solve) the anomaly. For evaluating the likelihood through classifier $h_A$, a feature vector X may be generated from the set of quantified metrics $\{M_i\}$ or from a signature S thereof. Trained classifier $h_A$ is formed using a set of training data $\{T\}$. In an example, a training data set $\{T\}$ includes training triplets; each training triplet may include, for example, (i) an observed anomaly signature $S_{obs}$, (ii) a tested action $A_{test}$ for addressing observed anomaly signature $S_{obs}$, and (iii) a result Y (i.e., solved or not solved) of using tested action $A_{test}$. Formation of a trained classifier $h_A$ is further detailed below with respect to FIGS. 3, 11 and 12. Examples of classifiers include, among others, K-nearest neighbor classifiers, support vector machine classifiers, or Bayesian network classifiers, as further illustrated below.

The following description is broken into sections. The first, labeled "Environment," describes an exemplary environment in which various examples may be implemented. The second section, labeled "Components," describes examples of various physical and logical components for implementing various examples. The third section, labeled "Operation," describes steps taken to implement various examples.

Environment

Figure 2:
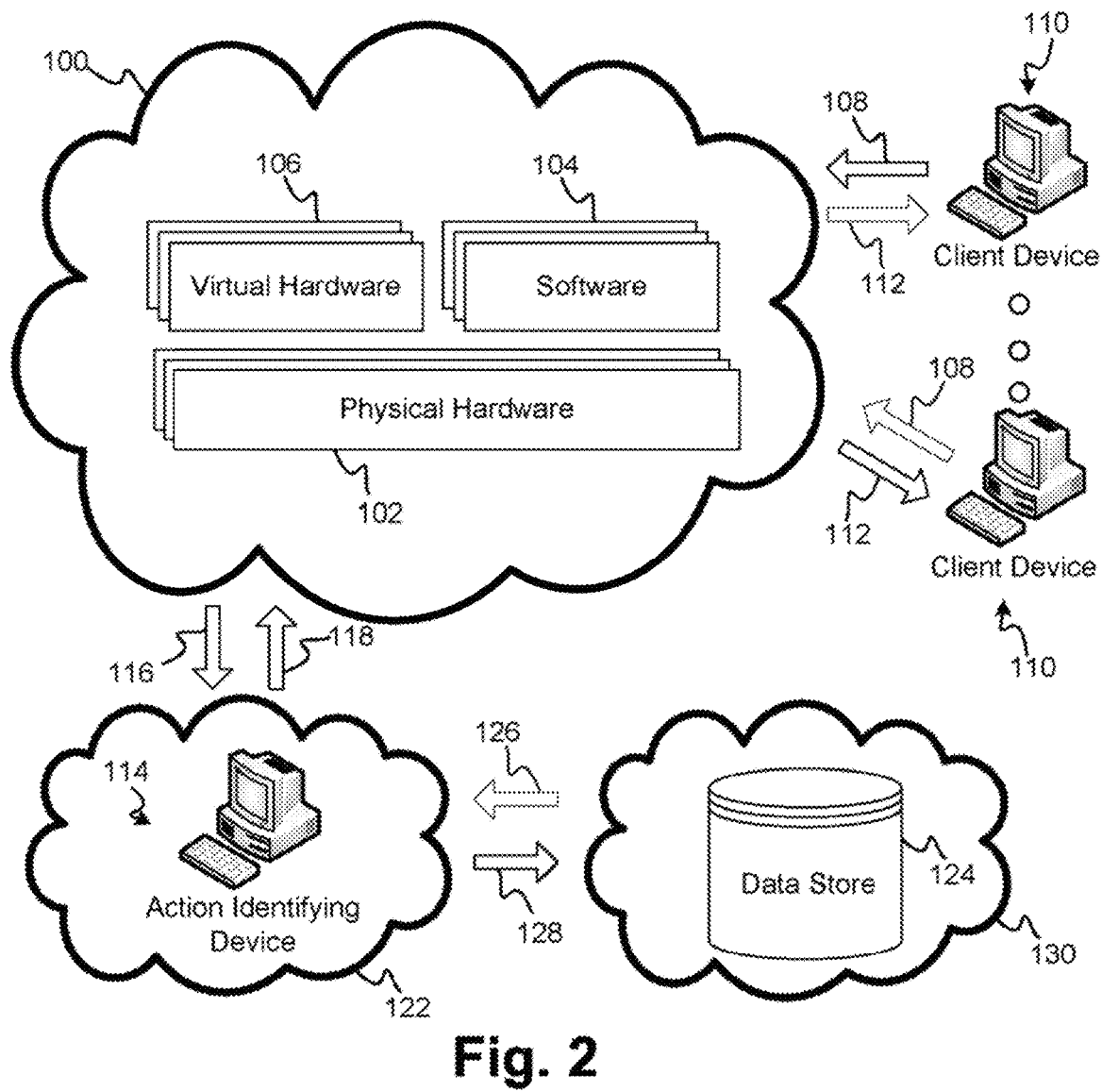
FIG. 2 shows an environment in which various examples may be implemented.

FIG. 2 is a schematic diagram of an example of an environment in which various examples may be implemented. The environment includes a cloud computing system 100 (hereinafter referred to as cloud 100), client devices 110 and an action identifying device 114. Cloud 100 includes a combination of physical hardware 102, software 104, and virtual hardware 106. Cloud 100 is configured to (i) receive requests 108 from client devices 110, and (ii) return request responses 112. By way of example, cloud 100 may be a private cloud, a public cloud or a hybrid cloud. Further, cloud 100 may be a hybrid cloud, i.e., a combination of cloud computing systems including a private cloud (or multiple private clouds) and a public cloud (or multiple public clouds).

Physical hardware 102 may include, among others, processors, memory devices, and networking equipment. Virtual hardware 106 is a type of software that is processed by physical hardware 102 and designed to emulate specific software. For example, virtual hardware 106 may include a virtual machine (VM), i.e., a software implementation of a computer that supports execution of an application like a physical machine. Software 104 is a set of instructions and data configured to cause virtual hardware 106 to execute an application. Thereby, cloud 100 can make a particular application available to client devices 110. Client devices 110 represent computing devices configured to interact with an application deployed in cloud 100.

An application may be executed in cloud 100 using a specific (but adjustable) configuration of physical hardware 102, software 104, and virtual hardware 106. An example of application is an E-commerce application providing users, through a web-based tool, with a specific functionality, e.g., registering to an online service, accessing data related to a product (i.e., browsing), or buying a product. Other examples of applications include, among others, enterprise applications, accounting applications, multimedia related applications, or data storage applications.

A specific configuration of cloud 100 supporting execution of an application is composed, generally, of multiple components. For example, a web application may use a Tomcat web server and a MySQL database. These components may be of different types. An example of component type is a server, i.e., a conjunction of hardware and software dedicated to perform computational tasks associated with execution of the application upon request. A server may be comprised of VMs including respective operating systems. Another example of component type is middleware, i.e., software building a set of services that facilitate multiple processes running on one or more VMs to interact. Examples of middleware include web databases or similar tools that support application development and delivery. An application may be scaled, e.g., by adding or removing instances of components supporting its execution. For example, VMs or middleware components may be added or removed.

Multiple actions may be performed for changing the specific configuration of resources in cloud 100 supporting execution of an application, such as any of the following: (a) adding a component type; (b) removing a component type; (c) re-allocating resources of cloud 100 realizing an instance of a component; (d) re-starting an instance of a component; or (e) changing the configuration of an instance of a component (e.g., allocate more memory or a higher CPU to an instance). Actions a) and b) are actions performed on a component type; actions c) to e) are actions on instances of components. It will be understood that this list of actions is not exhaustive. There is a vast variety of actions that may be performed for changing a configuration of cloud resources supporting execution of an application.

Executing an application in cloud 100 may involve, e.g., any of the following: (i) receiving a number of requests 108 from client devices 110; (ii) processing requests 108 according to the particular functionality implemented by the application; and (iii) returning request responses 112. The resources of cloud 100 supporting execution of the application (e.g., portions of physical hardware 102, virtual hardware 104, and software 106) may be scaled depending on the demands posed on the application. For example, cloud 100 may vary size of the resources allocated to the application depending on, for example, (a) the number of requests 108, (b) the number of devices 110 interacting with the application, or (c) requirement on the performance of the application (e.g., a specific service level agreement). Further, resources of cloud 100 allocated to an application may be adjusted for responding to an anomaly in the execution of the application, as further illustrated below.

Action identifying device 114 represents a computing system configured to interact with cloud 100 for identifying an action for responding to an anomaly in the execution of an application in cloud 100. Action identifying device 114 may interact with cloud 100 by sending requests 116 and receiving results 118 as a response to requests 116. By way of example, requests 116 may include monitoring requests for obtaining information related to execution of an application in cloud 100 (e.g., performance information or log messages of components supporting the application). Action identifying device 114 may automatically identify an action for responding to an anomaly based on data from results 118 relating to monitoring requests. In another example, requests 116 may include action requests for performing an action on the application execution in cloud 100

Figure 5:
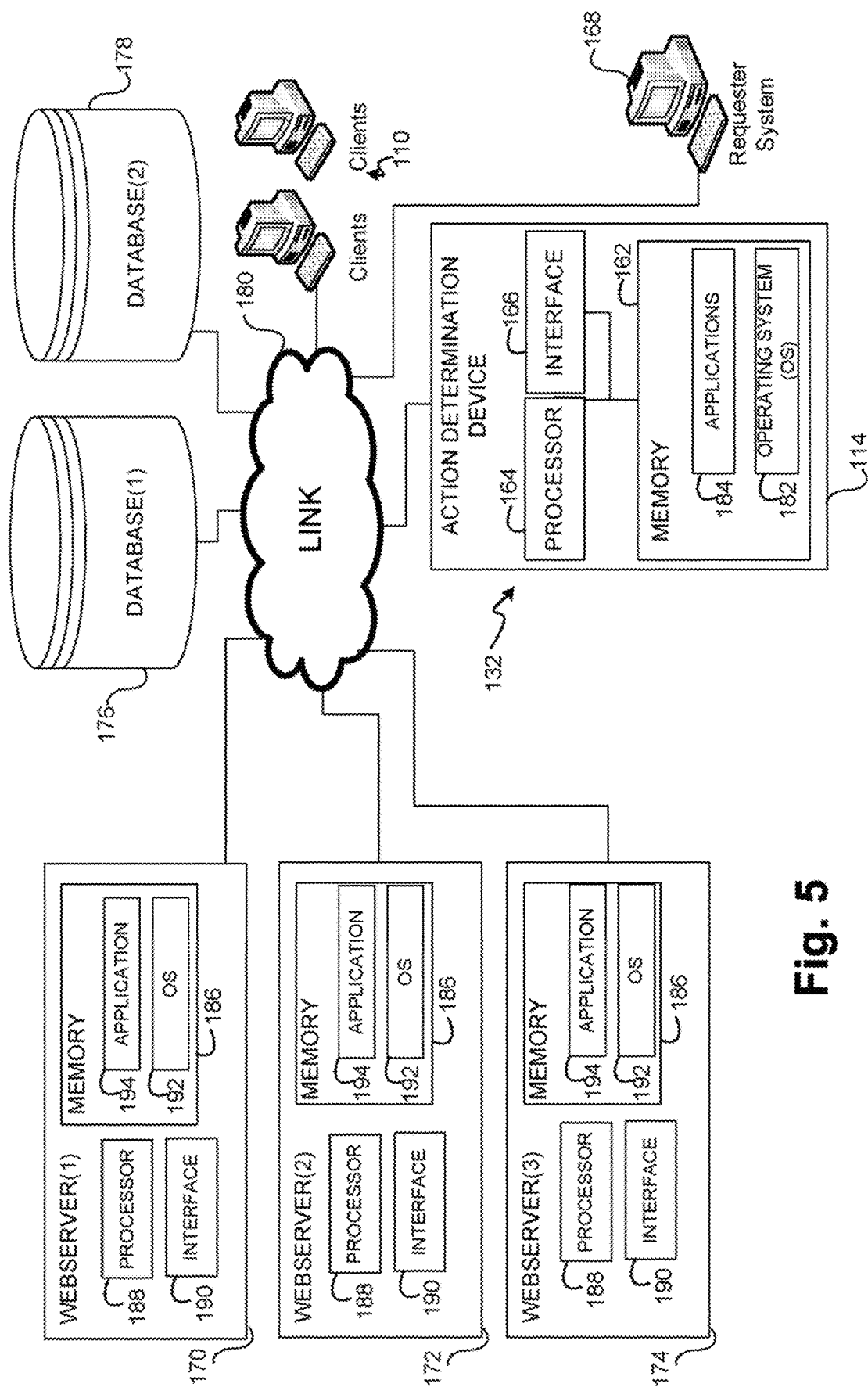
FIG. 5 is a block diagram depicting an implementation of the system of FIG. 2.

Looking ahead, FIG. 5 shows that action identifying device 114 may be operatively coupled to an identification requester system 168, so that action identifying device 114 performs an action identification upon receiving a request from identification requester system 168 and sends a result of the identification to identification requester system 168. As illustrated in FIG. 2, action identifying device 114 may be deployed in a cloud computing system 122. Cloud computing system 122 may form part of cloud 100 or be a different cloud computing system communicatively coupled to cloud 100 through a link (see FIG. 5 for an example of link). Other alternatives are contemplated, e.g., action identifying device 114 may be deployed on the premises of an identification requester.

Data store 124 represents, generally, any memory configured to store data that can be accessed by action identifying device 114 in the performance of its functions. As will be described in more detail below, those functions may include accessing data related to trained classifiers by reading classifier data 126 stored in data store 124 or writing updating data 128 in data store 124 for updating data associated with a classifier. Data store 124 is shown deployed in a cloud computing system 130. Alternatively, data store 124 may be deployed on the premises of an identification requester.

Components

Figure 3:
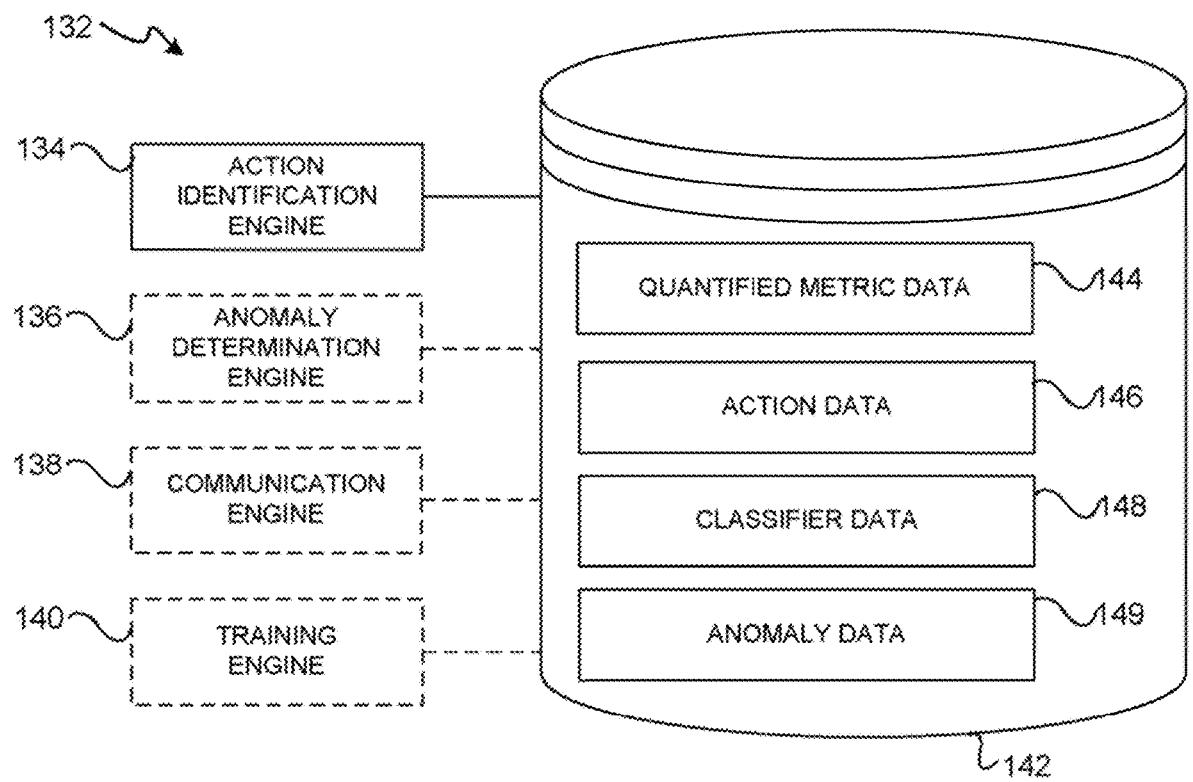
FIG. 3 depicts a system according to an example.
Figure 4:
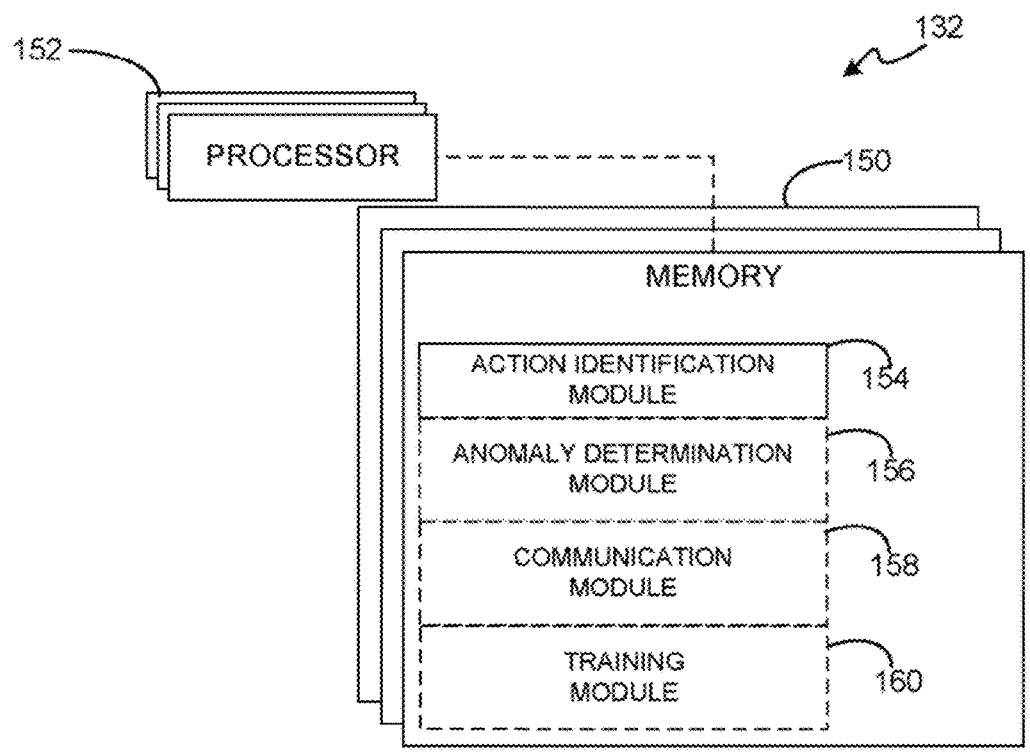
FIG. 4 is a block diagram depicting a computer readable medium according to an example.

FIGS. 3 to 5 depict physical and logical components for implementing various examples. FIG. 3 depicts a system 132 for identifying an action for responding to an anomaly in the execution of an application in a cloud computing system. In the example, system 132 includes an action identification engine 134. System 132 may further include an anomaly determination engine 136, a communication engine 138, and/or a training engine 140.

Action identification engine 134 represents, generally, any combination of hardware and programming configured to identify an action for responding to an anomaly in the execution of the application in the cloud computing system. Action identification engine 134 performs this task by using trained classifiers. Action identification engine 134 may perform this task upon anomaly determination engine 136 determines that a set of quantified metrics is associated with an anomaly. Alternatively, action identification engine 134 may perform this task upon receiving and processing a signal from another system associating a set of metrics with an anomaly.

Action identification engine 134 may perform the above task by processing a set of quantified metrics associated with an anomaly. The set may include one or more raw values, each raw value corresponding to a quantified metric. An example of a raw value of a quantified metric is a measured CPU usage for a time interval is 80%. In another example, the raw value is a mean of a plurality of measurements. Quantified metrics may be stored in data store 142 as part of quantified metric data 144.

Action identification engine 134 may process quantified metrics for computing a likelihood that an action solves an anomaly using a trained classifier associated with the action. For computing the likelihood, action identification engine 134 may compute a feature vector X using quantified metric data 144. Generally, the format of feature vector X depends on the used trained classifier. Examples of feature vectors are given below. Data associated with trained classifiers, e.g., classifier data rendering a trained classifier, may be stored in data store 142 as part of classifier data 148. Data associated with an action (or actions) may be stored in data store 142 as part of action data 146. Action data 146 may include data of parameters associated with the cloud computing system, so that a stored action can be applied in the execution of an application. Classifier data 148 may include data related to a plurality of trained classifiers, each trained classifier being associated with an action in action data 146.

In an example, action identification engine 134 identifies an action for responding to the anomaly by determining whether a computed likelihood is sufficiently high, e.g., that the computed likelihood is higher than a selected threshold. Another example is as follows. Action identification engine 134 may compute a likelihood than an action solves an anomaly associated with the set of quantified metrics for a plurality of actions. Action identification engine 134 uses a classifier associated with a specific action for computing a likelihood. Action identification engine 134 may then rank the different actions based on a score computed for each action taking into account the likelihood that an action solves the anomaly and the cost for executing the action. In this example, action data 144 may further include data related to a function for computing a cost V of performing the action. For example, cost V may be one of a monetary cost $ of performing the action, a time T to perform the action, a risk R of performing an action, or a combination thereof, as further detailed below.

Actions stored in action data 146 may be divided into different classes of actions. In an example, actions are divided into component type actions and component instance actions. A component type action corresponds to an action that may be performed on a component type of the cloud computing system, e.g., adding a VM running a web server. A component instance action corresponds to an action that may be performed on an instance of a component of the cloud computing system. Dividing actions into different classes simplifies the task of identifying an action for addressing an anomaly.

Analogously, classifiers stored in classifier data 148 may be divided into different classes of classifiers. In the example above, classifiers may be divided into component type classifiers and component instance classifiers. A component type classifier is for computing a likelihood that a component type action solves an anomaly. A component instance classifier is for computing a likelihood that a component type action solves an anomaly. In the example, actions on component types can be evaluated independently from actions on component instances.

Figure 7:
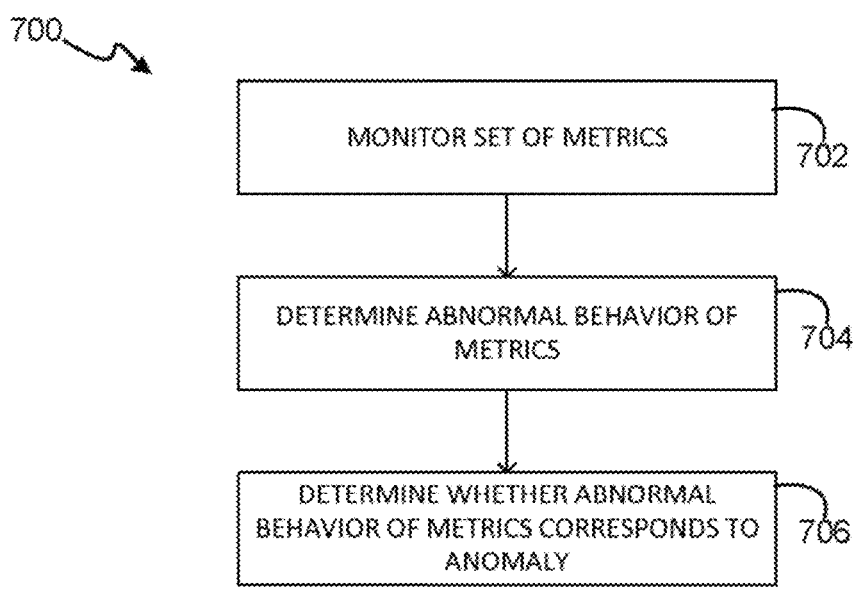

Anomaly determination engine 136 represents, generally, any combination of hardware and programming configured for automatically determining whether the set of quantified metrics is associated with an anomaly, as further detailed below with respect to FIG. 7. For performing this task, anomaly determination engine 136 may access process data forming part of anomaly data 149.

Communication engine 138 represents, generally, any combination of hardware and programming configured to communicate system 132 with another system such as cloud 100 or identification requester system 168 (see FIG. 5). Communication engine 138 may be for facilitating monitoring by system 132 of execution of an application in cloud 100. Communication engine 138 may be for causing application of the identified action on the execution of the application in cloud 100. Communication engine 138 may be for receiving a request from a requester system for performing action identifying. Communication engine 138 may be for communicating an identified action or a ranking of identified actions to a client computer system. Thereby, it is facilitated recommending an identified action to a user, for example an administrator in charge of the proper execution of an application in cloud 100.

Training engine 140 represents, generally, any combination of hardware and programming configured to automatically train a classifier. Further details about how training engine 140 may execute this task by processing a training data set is illustrated below with respect to FIG. 12.

In the foregoing discussion, various components were described as combinations of hardware and programming. Such components may be implemented in a number of fashions. Looking at FIG. 4 the programming may be processor executable instructions stored on a tangible memory media 150 (i.e., a computer readable medium) and the hardware may include a processor 152 for executing those instructions. Memory 150 can be said to store program instructions that, when executed by processor 152, implement system 132 of FIG. 3. Memory 150 may be integrated in the same device as processor 152 or it may be separate but accessible to that device and processor 152.

In one example, the program instructions can be part of an installation package that can be executed by processor 152 to implement system 132. In this case, memory 150 may be a portable medium such as a CD, DVD, or flash drive or a memory maintained by a server from which the installation package can be downloaded and installed. In another example, the program instructions may be part of an application or applications already installed. Here, memory 150 can include integrated memory such as a hard drive.

In FIG. 4, the executable program instructions stored in memory 150 are depicted as action identification module 154. Memory 150 may further store executable program instructions in the form of anomaly determination module 156, communication module 158, or training module 160. Action identification module 154 represents program instructions that, when executed, cause the implementation of action identification engine 134 of FIG. 3. Likewise, anomaly determination module 156 represents program instructions that, when executed, cause the implementation of anomaly determination engine 136 of FIG. 3. Likewise, communication module 158 represents program instructions that, when executed, cause the implementation of communication engine 138 of FIG. 3. Likewise, training module 160 represents program instructions that, when executed, cause the implementation of training engine 140 of FIG. 3.

As a further example, FIG. 5 depicts a block diagram illustrating an implementation of the system in FIG. 2 by action determination device 114. In the example of FIG. 5, action determination device 114 is shown to include a memory 162, a processor 164, and interface 166. Processor 164 represents, generally, any processor configured to execute program instructions stored in memory 162 to perform various specified functions. Interface 166 represents, generally, any interface enabling action determination device 114 to communicate, via a link 180, with, e.g., (i) resources in cloud 100 supporting execution of an application, and (ii) identification requester system 168. In the illustrated example, the components in cloud 100 supporting execution of an application are a first instance of a webserver 170, a second instance of the webserver 172, a third instance of the webserver 174, a first instance of a database 176, and a second instance of the database 178.

Memory 162 is shown to include operating system (OS) 182 and applications 184. OS 182 represents a collection of programs that when executed by processor 164 serve as a platform on which applications 184 can run. Examples of OSs include, but are not limited to, various versions of Microsoft's Windows® and Linux®. Applications 184 represent program instructions that, when executed by processor 164, function as an application for identifying an action for responding to an anomaly in the execution of an application in a cloud computing system. Applications 184, when executed, may function as a service that uses data communicated from identification requester system 168 to identify such an action. In response to a request for an action for addressing a particular anomaly associated with a particular metrics set by an identification requester system 168, that service returns an identified action for addressing the action to requester system 168. Such service may instead be supplied by a proxy (not shown).

Looking at FIG. 3, action identification engine 134, anomaly determination engine 136, communication engine 138, and training engine 140 are described as combinations of hardware and programming. The hardware portions may, depending on the embodiment, be implemented as processor 164. The programming portions, depending on the embodiment, can be implemented by OS 182, applications 184, or combinations thereof.

Referring back to FIG. 5, some of the components of cloud 100, such as webserver instances 170-174, may be implemented as VMs. A VM may run one or more instances of webservers. Each instance of a webserver may include a virtualized a memory 186, a virtualized processor 188, and a virtualized interface 190. Processor 188 represents, generally, any virtualized resource configured to execute program instructions stored in virtualized memory 186 to perform various specified functions. Interface 190 represents, generally, any virtualized resource that enable instances 170-174 to communicate, via link 180, with other components in cloud 100 supporting execution of an application (e.g., database instances 176, 178) as well as client devices 110, identification requester system 168, or action determination device 114.

Memory 186 is shown to include OS 192 and application 194. Operating system 182 represents a collection of programs that when executed by processor 188 serve as a platform on which application 194 can run. Examples of operating systems include, but are not limited, to various versions of Microsoft's Windows® and Linux®. Application 194 represent program instructions that when executed by processor 164 function as an application executed in a cloud computing system that can be accessed through client devices 110 for carrying out a specific task. Application 194 may be accessed by action identifying device 114 for performing some of the methods described herein. Identification requester system 168 may be in charge of controlling execution of application 194.

Database instances 176, 178 represent logical and physical materialization of data in the database, files maintaining the data, computer memory for maintaining the data, and computer data storage (i.e., memory). Databases 176, 178 may be viewed as multiple instances cooperating for realizing a single database. Each of the components of cloud 100 may include a monitor (not shown) configured to acquire and maintain stored metrics associated with performance of each component. Such monitor may also generate and maintain data logs associated with anomalies in the functioning of the components.

The components in FIG. 5 interact with each other through a link 180 that represents, generally, one or more of a cable, wireless, fiber optic, or remote connections via a telecommunication link, an infrared link, a radio frequency link, or any other connectors or systems that provide electronic communication. Link 180 may include, at least in part, an intranet, the Internet, or a combination of both. Link 180 may also include intermediate proxies, routers, switches, or load balancers for balancing a load generated by client devices 110 on the execution of application 194.

Operations

FIGS. 6 to 8, 11, and 12 are exemplary flow diagrams of steps taken to implement examples of methods for identifying an action for addressing an anomaly. In discussing these Figures, reference is made to the diagrams in FIGS. 1 to 5 to provide contextual examples. Implementation, however, is not limited to those examples. Reference is also made to the examples depicted in FIGS. 9 and 10. Again, such references are made simply to provide contextual examples.

Figure 6:
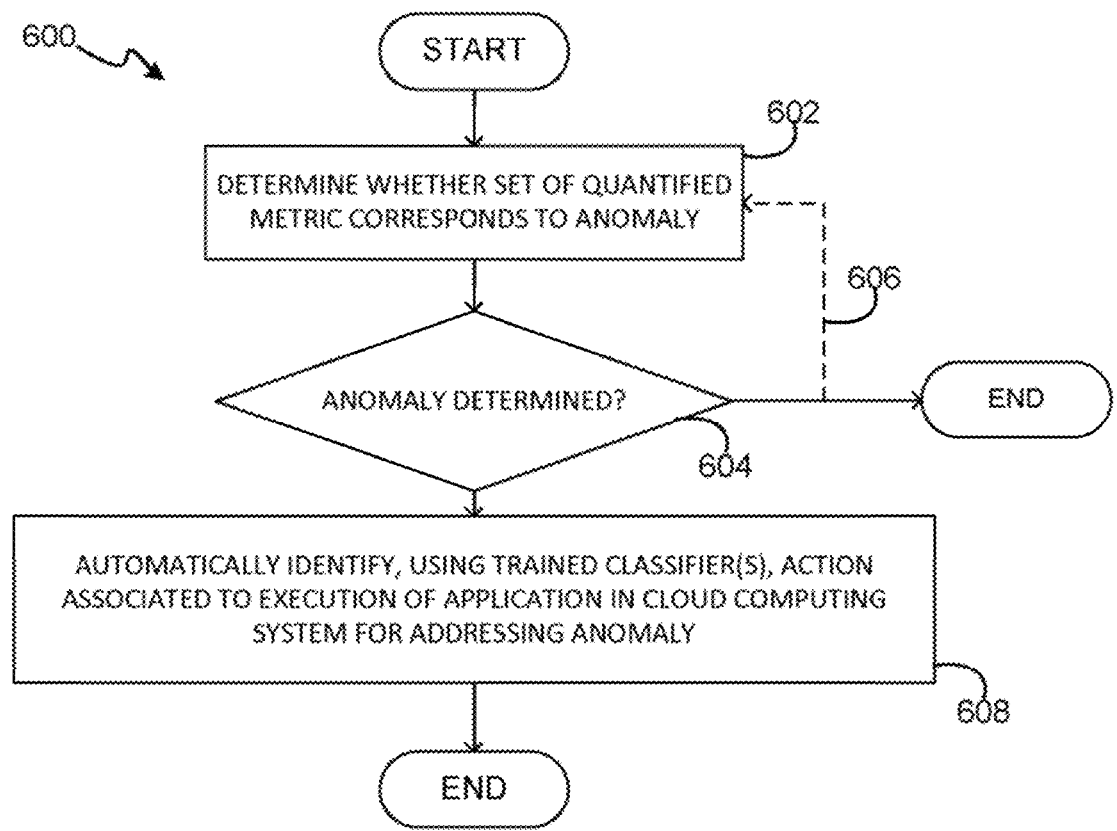

FIG. 6 shows a process flow 600 of a method for identifying an action for addressing an anomaly. At step 602, it is determined whether a set of quantified metrics corresponds to an anomaly. Referring to FIG. 3, anomaly determination engine 136 may be responsible for implementing step 602. Looking ahead to FIG. 7, an example of a method for automatically determining whether a set of quantified metrics corresponds to an anomaly is shown as a process flow 700.

At step 702, a set of metrics are monitored over time. At step 704, it is determined whether a metric in the monitored set of metrics is experiencing an abnormal behavior by comparing metric samples with a pre-determined metric normal behavior. Such metric normal behavior may be pre-determined either by anomaly determination engine 136 or another suitable system. Pre-determination may include monitoring an application both from an end user perspective (e.g., response times to requests 108) and system utilization perspective (e.g., utilization of resources in cloud 100 supporting execution of the application). Pre-determination of metric normal behavior may be based on monitors that measure execution of the application and usage of resources associated therewith.

At step 706 it is determined whether an abnormal behavior corresponds to an anomaly. Step 706 may be implemented by determining whether the abnormal behavior meets specific conditions for being classified as an anomaly. By way of example, a statistical significance may be computed for the abnormal behavior; then, it may be determined whether the abnormal behavior corresponds to an anomaly based on the computed statistical significance. In order to determine if an anomaly is 'significant', a threshold value may be used. If the computed anomaly significance is beyond the threshold, the quantified metrics are determined to correspond to an anomaly.

A statistical significance may be computed using different parameters and respective weights. These parameters may include, for example, any of the following: (i) a number of items in the configuration supporting the execution of the application that show an abnormal behavior, (ii) a number of metrics that show an abnormal behavior; or (iii) a deviation from normal behavior of a quantified metric. Process flow 700 facilitates establishing different levels for determining an anomaly and, therefore, reduction of false alarms.

It will be understood that process flow 700 is a non-limiting example of a method for automatically determining whether a set of quantified metrics corresponds to an anomaly. Others methods are contemplated herein. For example, an anomaly may be determined by comparing a signature derived from the quantified metrics and pre-determined metric normal behavior including a set of "normal" signatures. Based on established similarities, it may be determined whether the signature of the sampled metrics corresponds to an anomaly. An example of a method for establishing similarities between signatures is described in U.S. Pat. No. 7,502,971 and is hereby incorporated by reference with this respect. In another example for automatically determining an anomaly, each quantified metric is directly compared to a respective pre-determined threshold. An anomaly may be determined if a certain number of thresholds are infringed.

Continuing with FIG. 6, at step 604, the result of step 602 is evaluated to decide the further procedure in process flow 600. Referring to FIG. 3, anomaly determination engine 136 may be responsible for implementing step 604. If an anomaly is determined, process flow 600 goes to step 608. If no anomaly is determined, process flow 600 is ended. Alternatively, process flow 600 may go back to step 602 following closed-loop 606. Then step 602 may be performed for another set of quantified metrics (e.g., metrics quantified after a specific time interval elapses).

At step 608 an action is automatically identified for addressing the anomaly using a trained classifier. A trained classifier relates a metrics set to a result of performing an action for addressing an anomaly. Referring to FIG. 3, action identification engine 134 may be responsible for implementing step 608.

Figure 8:
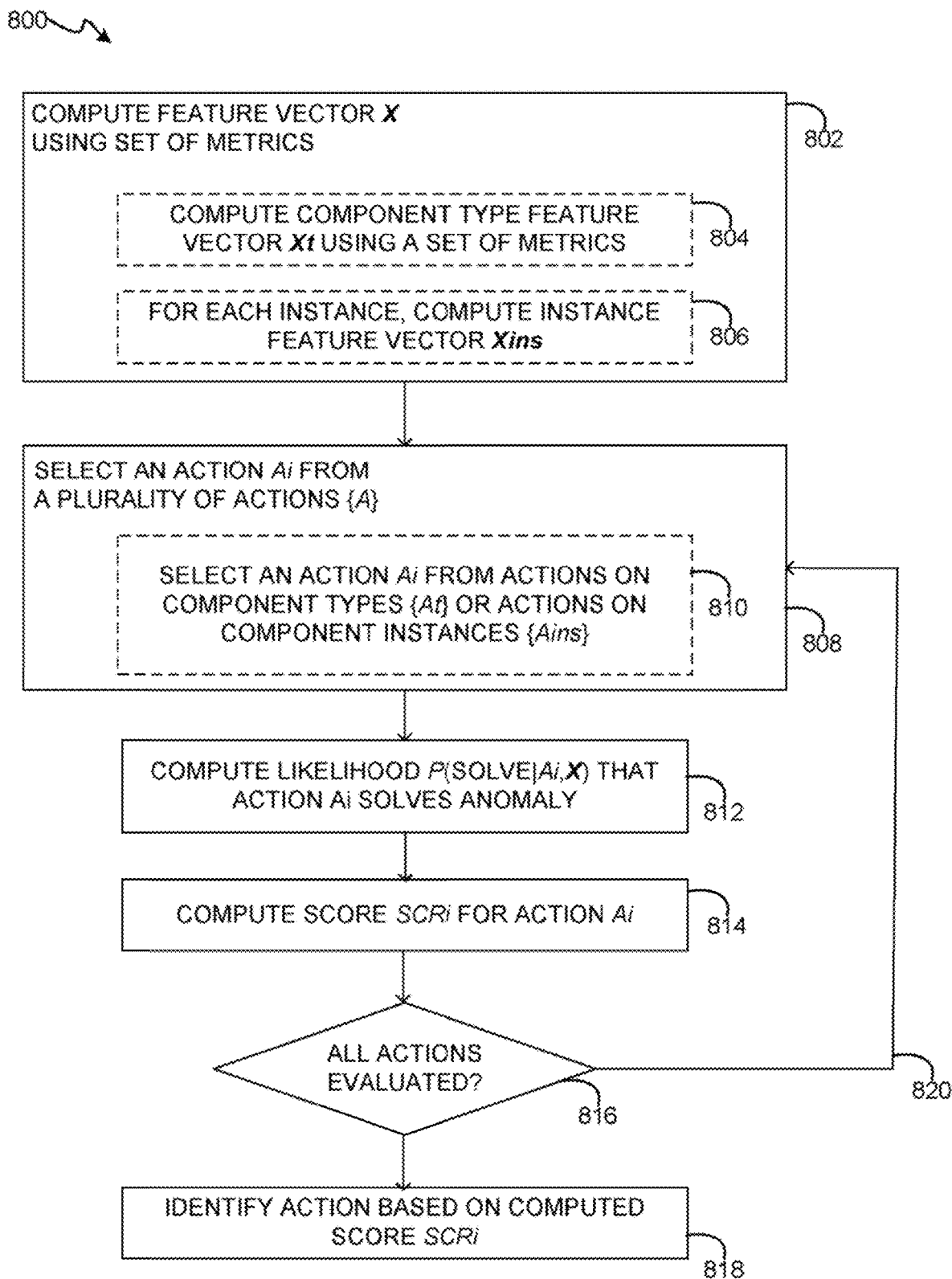

Looking ahead to FIG. 8, an example of a method for performing step 608, i.e., action identification, is shown as a process flow 800. At step 802, a feature vector X is computed using a set of metrics. Feature vector X is a numerical representation of an anomaly state and is used for evaluating a likelihood P that a specific action $A_i$ solves an anomaly, i.e., P(SOLVE|$A_i$, X). A feature vector, as used herein, may be seen as a reduced representation set of features corresponding to a set of metrics associated with an anomaly. Transforming the set of metrics into the set of features is called feature extraction. Examples of feature extraction described herein facilitate extracting the relevant information regarding the anomaly from the set of metrics in order to perform action identification using a reduced representation instead of a full size input.

Feature vector X may be constructed using a signature formed from a metrics set. FIG. 9 shows a signature formed as a table 900. Table 900 includes a list 902 of component types (e.g., a server, and a database) supporting execution of the application. Further, table 900 includes a list 904 of instances of each component type. For example, referring to FIG. 5, the resources of cloud 100 supporting execution of an application may include three instances 170, 172, 174 of a webserver and two instances 176, 178 of a database. Further, table 900 includes a list 906 of metrics. Each component instance is associated with one or more metrics.

Signatures may be periodically determined, such as for each time interval when metrics are collected. A signature may include further, or different, information as shown in FIG. 9. For example, a signature may include, or consist of, an attribute vector. The attribute vector includes an entry for each metric. For example, an entry with value '1' is assigned to a metric, if that metric is determined to be a key metric whose raw value is determined to be indicative of an anomaly during a time interval. That metric is referred to as attributed. An entry with value '−1' is assigned to a metric if that metric is determined to be a key metric whose raw value is not determined to be indicative of an anomaly. That metric is referred to as not attributed. An entry with value '0' is assigned to a metric if that metric is determined not to be indicative of any state of the computer resource, such as not being indicative of an anomaly, based on the models for that time interval. That metric is referred to as irrelevant to the anomaly state. Another type of signature may be a combination of raw values of metrics and attributes, in which each raw value is multiplied ('AND' operation) by its respective entry in the attribute vector.

Table 1 shows examples of signatures for a state of anomaly in the cloud components shown in FIG. 5 as supporting execution of an application. Table 1 lists values for three types of signatures (raw value, metric attribution, raw value AND metric attribution), one or more of which may be generated by action identification engine 134 and stored in data store 142 as part of quantified metric data 144. The raw value column lists the raw values for each metric for a raw value signature. The metric attribution column lists values for metric attribution signature. The raw value AND metric attribution column lists values for a raw value AND metric attribution signature. Table 1 also includes data related to the component type and instance associated with a particular metric. For the example in Table 1, the following normal behavior is assumed for attributed metrics: average queries processed 0.8; average memory usage 0.6; average CPU usage 0.5.

TABLE 1

Examples of Signatures

| Component Type | Instance | Metric Type | Raw Value | Metric Attribution | Raw Value AND Metric Attrib. |
|---|---|---|---|---|---|
| Database | Database(1) | Queries | 2000 | 0 | 0 |
| | | Queries processed (0-1) | 0.9 | 1 | 0.9 |
| | Database(2) | Queries | 1000 | 0 | 0 |
| | | Queries processed (0-1) | 0.2 | −1 | −0.2 |
| Webserver | Webserver(1) | Memory usage (0-1) | 0.7 | 1 | 0.7 |
| | | CPU Usage (0-1) | 1 | 1 | 1 |
| | Webserver(2) | Memory usage (0-1) | 0.6 | −1 | −0.6 |
| | | CPU usage (0-1) | 1 | 1 | 1 |
| | Webserver(3) | Memory usage (0-1) | 0.6 | −1 | −0.6 |
| | | CPU usage (0-1) | 1 | 1 | 1 |

In the following, an example for computing a feature vector X is illustrated. As shown in FIG. 8, step 802 may include (i) a sub-step 804 in which a component type feature vector $X_t$ is computed using the set of metrics, and (ii) a sub-step 806 in which an instance feature vector $X_{ins}$ is computed for each component type.

For performing sub-step 804, i.e., computing a component type feature vector $X_t$, the following procedure may be used:

---
PROCEDURE 1:
---
FOR j= 1 to N, N being the number of component types supporting the application:
    {FOR i= 1 to $M_j$, $M_j$ being the number of metrics related to each component type:
        {COMPUTE AND STORE average deviation from a normal behavior for all metrics on all instances flagged as abnormal;
        COMPUTE AND STORE fraction of metrics in all instances flagged as abnormal;}
}

Procedure 1 results in a vector with dimension $2 \times (M_1 + M_2 \ldots + M_N)$. In the example of Table 1 above, N (number of component types) is two, i.e., a database type and a webserver type; $M_1$ (number of metrics related to the first component type, i.e., database type) is one, i.e., 'queries processed' (note that the metric 'queries' is flagged as not attributed); finally, $M_2$ (number of metrics related to the second component type, i.e., webserver type) is two, i.e., memory usage and CPU usage. The resulting feature vector is six-dimensional. Table 2 is an example of a component type feature vector using the signatures in Table 1.

TABLE 2

Example of Component Type Feature Vector

| Index of Proc. 1 | $X_t$ | Value | Comment |
|---|---|---|---|
| j = 1; i = 1 | X(1) | 0.1 | Avg. deviation for 'Queries Processed' of 'Database' |
| j = 1; i = 1 | X(2) | 0.5 | Fraction of anomalies for 'Queries Processed' of 'Database' |
| j = 2; i = 1 | X(3) | 0.1 | Avg. deviation for 'Memory Usage' of 'Webserver' |
| j = 2; i = 1 | X(4) | 0.33 | Fraction of anomalies for 'Memory Usage' of 'Webserver' |
| j = 2; i = 2 | X(5) | 0.5 | Avg. deviation for 'CPU Usage' of 'Webserver' |
| j = 2; i = 2 | X(6) | 1.0 | Fraction of anomalies for 'CPU Usage' of 'Webserver' |

For performing sub-step 806, i.e., computing an instance feature vector $X_{ins}$, the following procedure may be used:

---
PROCEDURE 2:
---
FOR j = 1 to K, K being the number of instances in a component type:
    {FOR i = 1 to L, L being the number of metrics related to each component type:
        {COMPUTE AND STORE average deviation from a normal behavior for each metric of the instance flagged as abnormal;
        COMPUTE AND STORE for each metric of the instance, fraction from total number of metrics flagged as abnormal for the instance;}
}

Procedure 2 is repeated for each component type. Each generated vector is a vector with dimensions $2 \times K \times L$ (assuming that each instance of a component type is associated with the same metrics).

In the example of Table 1 above, two instance feature vectors may be computed, one for component type 'Database', and one for component type 'Webserver'. For the instance feature vector related to 'Database', K (number of instances) is two; L (number of metrics related to 'Database') is one (note that the metric 'queries' is flagged as not attributed); the resulting feature vector related to 'Webserver' is four-dimensional. Table 3 is an example of instance type feature vector for component type 'database' using the signatures in Table 1.

TABLE 3

Instance Feature vector related to 'Database'

| Index of Proc. 1 | $X_{inst}$ | Value | Comment |
|---|---|---|---|
| j = 1; i = 1 | X(1) | 0.1 | Avg. deviation for 'Queries Processed' of Database(1) |

TABLE 3-continued

Instance Feature vector related to 'Database'

| Index of Proc. 1 | $X_{inst}$ | Value | Comment |
|---|---|---|---|
| j = 1; i = 1 | X(2) | 1 | Fraction of abnormal metrics part of Database(1) |
| j = 2; i = 1 | X(3) | 0 | Avg. deviation for 'Queries Processed' of Database(2) |
| j = 2; i = 1 | X(4) | 0 | Fraction of abnormal metrics part of Database(2) |

For the instance feature vector related to 'Webserver', K (number of instances) is three; L (number of metrics related to 'Webserver') is two; the instance feature vector related to 'Webserver' is twelve-dimensional. Table 4 is an example of instance type feature vector for component type 'webserver' using the signatures in Table 1 and a normal behavior in which the average memory usage is 0.6 and average CPU usage is 0.5.

TABLE 4

Instance Feature Vector Related to 'Webserver'

| Index of Proc. 1 | $X_{inst}$ | Value | Comment |
|---|---|---|---|
| j = 1; i = 1 | X(1) | 0.1 | Avg. deviation for 'Memory Usage' of Webserver(1) |
| j = 1; i = 1 | X(2) | 0.5 | Fraction of abnormal metrics part of Webserver (1) |
| j = 1; i = 2 | X(3) | 0.5 | Avg. deviation for 'CPU Usage' of Webserver(1) |
| j = 1; i = 2 | X(4) | 0.5 | Fraction of abnormal metrics part of Webserver (1) |
| j = 2; i = 1 | X(5) | 0 | Avg. deviation for 'Memory Usage' of Webserver(2) |
| j = 2; i = 1 | X(6) | 0 | Fraction of abnormal metrics part of Webserver (2) |
| j = 2; i = 2 | X(7) | 0.5 | Avg. deviation for 'CPU Usage' of Webserver(2) |
| j = 2; i = 2 | X(8) | 1 | Fraction of abnormal metrics part of Webserver (2) |
| j = 3; i = 1 | X(9) | 0 | Avg. deviation for 'Memory Usage' of Webserver(3) |
| j = 3; i = 1 | X(10) | 0 | Fraction of abnormal metrics part of Webserver (3) |
| j = 3; i = 2 | X(11) | 0.5 | Avg. deviation for 'CPU Usage' of Webserver(3) |
| j = 3; i = 2 | X(12) | 1 | Fraction of abnormal metrics part of Webserver (3) |

Continuing with FIG. 8, at step 808, an action $A_i$ is selected from a plurality of actions {A}. According to some examples, step 808 may include a step 810 at which an action $A_i$ is selected from a plurality of actions including at least one component type action {$A_t$} and at least one component instance action {$A_{ins}$}. Component type actions {$A_t$} correspond to actions performed on a component type of the cloud computing system. Component instance actions {$A_{ins}$} correspond to actions performed on an instance of a component of the cloud computing system.

As set forth above, each action class may be associated with a respective class of classifier. For example, component type actions {$A_t$} are associated with respective classifiers {$h_t$}; a likelihood that an action from the component type actions {$A_t$} solves a specific anomaly may be computed by evaluating its respective classifier using a component type feature vector $X_t$ computed using a signature associated with the anomaly. Component instance actions {$A_{ins}$} are associated with respective classifiers {$h_{ins}$}; a likelihood that an action from the component instance actions {$A_{ins}$} solves a specific anomaly may be computed by evaluating its respective classifier using a component instance feature vector $X_{ins}$ computed using a signature associated with the anomaly.

A plurality of actions used at step 808 can be stored in the form of a table as shown in FIG. 10. Table 1000 has a column 1002 with an action list. The actions list may include a list of actions 1004 and a list 1006 of classes to which actions belong. In the example, one action class 1008 is actions on component types; another action class 1010 is actions on component instances. Each action may be associated with a cost V listed in column 1012. A list of examples of actions that may be performed on components supporting application execution in FIG. 5 is given in Table 5 below.

TABLE 5

Example of Actions

| | |
|---|---|
| Actions on component types | Remove webserver |
| | Add webserver |
| | Remove database |
| | Add database |
| Actions on component instances | Restart instance |
| | Increase memory of a webserver |
| | Increase CPU of a webserver |
| | Move instance to a different location |

A cost $V_i$ of performing an action $A_i$ may be computed using a cost function F. The cost function F may have one or more of the following variables: (a) an actual monetary cost $\$_i$ of performing action $A_i$, (b) a time $T_i$ required for performing the action, and (c) a risk $R_i$ of taking the action (a risk may correspond, e.g., to a probability that the action causes another anomaly or severes the anomaly being addressed). The cost function may be a normalized function, i.e., a function taking values between 0 and 1. An example of a cost function F for obtaining a cost $V_i$ of performing action $A_i$ based on the above variables (the variables being normalized using maximum values) is:

$$F(V_i) = \frac{w_1 \$_i + w_2 T_i + w_3 R_i}{w_1 + w_2 + w_3},$$

where $w_1$, $w_2$, $w_3$ are weights associated with respective variables. A cost associated with an action may be utilized to compute a score associated with the action for identifying whether the action is appropriate for addressing an anomaly, as further set forth below with respect to step 814 of process flow 800.

Continuing with FIG. 8, at step 812 a likelihood P that a specific action $A_i$ solves an anomaly (i.e., P(SOLVE|$A_i$, X) is evaluated using (i) a trained classifier $h_A$ associated with action $A_i$ and (ii) a feature vector X computed as described above with respect to step 802.

Generally, a trained classifier $h_A$ is a set of instructions and data configured to determine whether a specific action A may address or not a specific anomaly corresponding to a specific set of metrics, which may be characterized by a signature S, based on a training data set {T}. The specific set of metrics is generally unknown while the training data set {T} contains known items, e.g., actions known to solve, or not solve, observed signatures of anomalies. In other words, classifier $h_A$ facilitates identifying which action is appropriate for addressing a new anomaly based on previous observations. In some examples herein, as discussed below with respect to FIGS. 11 and 12, a classifier is trained by (i)

obtaining observed anomalies signatures $\{S_{obs}\}$, (ii) converting observed anomalies signatures $\{S_{obs}\}$ into feature sets in the form of feature vectors $\{X_{obs}\}$, and (iii) learning the mapping between feature vectors $\{X_{obs}\}$ and actions $\{A\}$.

The classification problem addressed by a trained classifier $h_A$ for an action A can be stated as follows: given a training data set $\{T\}$ containing observed feature vectors $\{X_{obs}\}$, produce a rule (i.e., the classifier) $h_A$ that can be evaluated for any possible new feature vector X and such that the result Y (i.e., solved or not solved) associated with performing action A for solving an anomaly associated with new feature vector X, specifically $$Y^x = h_A(X),$$

is as close as possible to the true result Y, i.e., the result that would be observed by performing action A on resources of a cloud computing system supporting execution of the application under the anomaly associated with new feature vector X. It will be understood that for training data set $\{T\}$, "true" results Y are known but will not necessarily match their in-sample approximations $$Y^x = h_A(X_{obs}),$$

A likelihood P that a specific action A solves an anomaly associated with a new feature vector X (i.e., P(SOLVE|A, X)) may be evaluated based, for example, in the quality of the above approximation on which $h_A$ is based. It will be understood that how this likelihood is evaluated depends on the type of used classifier, as further illustrated below.

Classifiers $h_A$ used in methods and systems herein may be one or a combination of different types of classifiers. For example, classifier $h_A$ may be a linear classifier. A linear classifier $h_A^{lin}$ classifies an action A as solving or not solving an anomaly based on the value of a linear combination of values in a feature vector X associated with the anomaly. Further, classifier $h_A$ may be a Bayesian classifier $h_A^{bay}$ based on the assumption that at least some of the metrics in the set of metrics associated with an anomaly are independent and accordingly applying Bayes theorem for obtaining likelihood P(SOLVE|A, X). Further, classifier $h_A$ may be a Bayesian network classifier $h_A^{BayNet}$, which can be viewed as a collection of Bayesian classifiers interconnected for providing a joint probability distribution P(SOLVE|A, X). Application, including training and evaluation, of Bayesian and Bayesian network classifiers is illustrated, for example, in "Expert Systems and Probabilistic Network Models" by Castillo et al., Springer, December 1996.

A further example of classifier $h_A$ is a K-nearest neighbor (K-NN) classifier $h_A^{KNN}$, that employs a distance metric, such as an Euclidean distance, for associating a new feature vector X with an observed feature vector $X_{obs}$ from training data set $\{T\}$. A K-NN classifier for an action A may be evaluated for obtaining likelihood P(SOLVE|A, X) by, for example, evaluating a fraction of K-NN neighbors of feature vector X in the training set $\{T\}$. Application, including training and evaluation, of K-NN classifiers are illustrated in, for example, "Nearest Neighbor: Pattern Classification Techniques" by Dasarathy et al., Ieee Computer Society, December 1990.

A still further example of classifier $h_A$ is a support vector machine (SVM) classifier based on the principle of a safe separation between classes (i.e., solve and not solved) in such a way that the distance between the classes is maximized while misclassification are penalized proportionally to the distance between a feature vector X and its attributed class. Application, including training and evaluation, of SVM classifiers are illustrated in, for example, "Statistical Learning Theory" by Vapnik et al., Wiley-Interscience, September 1998. A SVM classifier may be evaluated for obtaining likelihood P(SOLVE|A, X) using analogous methods as described in, for example, "Probabilistic outputs for support vector machines and Comparisons to Regularized Likelihood Methods" by Platt et al., published in "Advances in Large Margin Classifiers," MIT Press, October 2000.

It will be understood that classifiers that can be used for automatically identifying an action as described herein are not limited to the examples above. Further, action identification engine may use different types of classifier, or a combination thereof for performing its task.

A trained classifier used by action identification engine 134 may be trained by training engine 140. Alternatively, an analogous training engine may be implemented in a system different from system 132. Such system may send data related to a trained classifier to system 132 such that action identification engine 134 can perform its function. An example for constructing a trained classifier is illustrated with respect to FIGS. 11 and 12.

FIG. 11 depicts a process flow 1100 for learning actions for addressing anomalies that may affect execution of an application in a cloud computing system. Referring to FIG. 3, training engine 140 may be responsible for implementing the steps in process flow 1100. At step 1102, normal behavior of an application is learned. For example, the application may be monitored, both from an end user perspective and resource utilization perspective. The monitored data may be analyzed for automatically generating behavior baselines. Alternatively, e.g., the behavior baselines may be pre-set based on, for example, service level objectives (SLO) or service level agreements (SLAs).

At step 1104, anomalies affecting execution of the application may be learned based on deviations from normal behavior. Such anomalies may be learned using automated methods as described above with respect to FIG. 7. Signatures associated with the anomalies may be generated as described above. Alternatively, or in addition thereto, such anomalies may be learned by observing (either automatically or by a human administrator) the application, either in production, in a sandbox environment, or using a simulation of workloads or a entire simulation of the application. Further, such anomalies may be learned from anomalies determined to affect another application known to be similar to the current application in terms of its components.

At step 1106, actions for addressing anomalies may be learned. Such actions may be learned using either automatically generated data, manually generated data, or a combination of both. In an example, actions are learned using an automated procedure, in which an action for addressing the anomaly is automatically determined by sequentially testing actions selected from a plurality of actions for execution of the application in the cloud computing system. These actions may be tested using workload generators similarly as in some automated performance and testing products, e.g., HP LoadRunner, Hewlett-Packard, Palo Alto (Calif.), US. Alternatively, or in addition thereto, such actions may be learned by observing (either automatically or by a human administrator) the effect of an action on the application being executed either in production, in a sandbox environment, or in a simulation of the application execution. Further, such actions may be learned from other applications known to be similar to the current application in terms of its components.

According to some examples, learned actions may be stored in a knowledgebase associating anomalies with actions. A knowledgebase may be managed by training engine 140 and form part of action data 146 in data store 142. A knowledgebase may also be configured to allow manually adding new actions [i.e., pre-set actions] and linking them to different anomalies. The knowledgebase may also facilitate control of other applications based on their architectural similarity to registered anomaly/action pairs. Thereby, a learning process as described herein for a new application may be improved.

At step 1108, a training data set may be built based on the anomalies and actions learned at steps 1104, 1106. For example, triplets $\{S_{obs}, A_{test}, Y\}$ may be built. $S_{obs}$ is a signature of an observed anomaly; $A_{test}$ is a tested action; Y is a result of trying to address the anomaly associated with $S_{obs}$ using $A_{test}$. Similarly as the signatures described above with respect to FIG. 8, observed signatures $S_{obs}$ may be used to compute features vectors X of different classes, such as component instance feature vectors $X_t$ and component type vectors $X_{ins}$.

Figure 12:
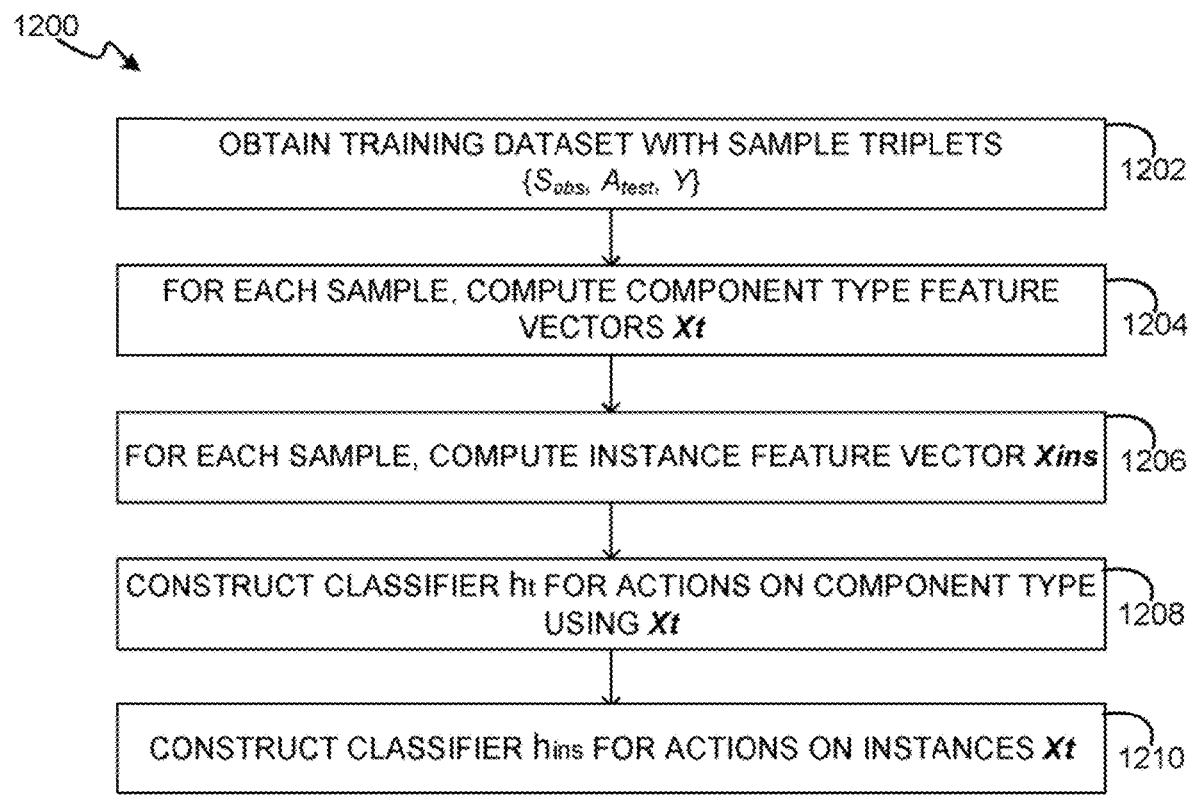

At step 1110, classifiers are constructed (i.e., trained) based on a training data set built at step 1108. FIG. 12 depicts a process flow 1200 illustrating an example of a method for performing step 1110. At step 1202, a training data set as described above with respect to step 1108 is obtained. At step 1204, component type vectors $X_t$ are computed for samples in the training dataset using the respective observed signatures $S_{obs}$. Component type vectors $X_t$ may be computed using Procedure 1 described above with respect to FIG. 8. At step 1206, component instance vectors $X_{ins}$ are computed for samples in the training dataset using the respective observed signatures $S_{obs}$. Component type vectors $X_{ins}$ may be computed using Procedure 2 described above with respect to FIG. 8.

Classifiers may be then constructed (i.e., trained) using the computed feature vectors and the further data in the training set relating actions and results. For example, at step 1208 classifiers $h_t$ for actions on component types may be trained using samples in the training data set relating to such actions; at step 1210 classifiers $h_{ins}$ for actions on component instances may be trained using samples in the training data set relating to such actions. The trained classifiers meet the condition of providing a rule that can be evaluated for a new feature vector and such that the result Y (i.e., solved or not solved) attributed to performing action A for solving an anomaly associated with a new feature vector is as close as possible to the true result R. It will be understood that the manner in which a classifier is constructed depends on the type of classifier. Details about training of different types of classifiers are, e.g., illustrated in the references cited above with respect to the different examples of classifiers.

Continuing with FIG. 8, at step 814 a score $SCR_i$ is computed for action $A_i$. In some examples, score $SCR_i$ is based on (i) likelihood that action $A_i$ solves an anomaly, and (ii) a cost of performing action $A_i$. Variable (i), likelihood, may be computed as set forth above with regard to step 812 for obtaining P(SOLVE|A, X); variable (ii), cost, may be computed as set forth above with regard to cost function F for obtaining a cost $V_i$, which value may be normalized. In an example, score $SCR_i$ may be computed as $$SCR_i = F(SOLVE|A,X) \times (1-V_i)$$

where $V_i$ is normalized. The example of score $SCR_i$ above facilitates identifying which action from the plurality of actions {A} has the highest likelihood of solving the anomaly at a minimum cost. It will be understood that $SCR_i$ may be computed using other methods. For example, the variables for computing $SCR_i$ may be weighted differently or other factors may be included as variables of the score (e.g., a preference variable associated with a provider effecting the action).

At step 816, it is evaluated whether all actions required for executing process flow 800 are evaluated according to preceding steps. For example, all actions of the plurality of actions {A} may be evaluated. Alternatively, only some actions of the plurality of actions {A} may be evaluated. Actions to be evaluated may be chosen depending on the type of anomaly being addressed or other factors. If action evaluation is completed, process flow 800 goes to step 818. If some actions are still to be evaluated, process flow 800 goes back to step 808 following closed-loop 820; then steps 808-814 are performed for another action A of the plurality of actions (A).

According to some examples, it may be determined that addressing an anomaly requires training a classifier. For example, if at step 816 the computed likelihood P is too low for all evaluated actions, it is likely that either the actions evaluated are not appropriate for addressing an anomaly and/or the classifiers requires further training data for identifying an action appropriate for addressing an anomaly. If such determination occurs, system 132 may automatically train a classifier by accessing to new training data and/or determining further actions for addressing the anomaly. Such training data may be requested to another system or an administrator or be automatically acquired by testing and monitoring execution of the application under different conditions. Such further actions may be found using a knowledge base or using an automatic action learning method as described above.

At step 818, an action from the plurality of actions is identified based on the computed score. For example, an action may be identified as corresponding to the action from the plurality of actions with the highest likelihood of solving the anomaly at a minimum cost by selecting the action with a higher score SCR computed using the above score equation. In other examples, step 818 includes ranking actions. For example, actions of the plurality of actions {A} may be ranked according to the computed scores. Actions with a score below a selected threshold may be discarded. A selected threshold may be pre-set or may be dynamically set based on, for example, an average score value. The action with the highest score may be automatically applied for addressing an anomaly. Further, actions may be sequentially tested according to the ranking while monitoring application execution for automatically identifying an action that solves an anomaly. In some examples, system 132 may cause that the ranking of actions is recommended to an administrator, which may then decide which action should be applied for addressing an anomaly.

Conclusion

FIGS. 2-5 aid in depicting the architecture, functionality, and operation of various examples. In particular, FIGS. 3-5 depict various physical and logical components. Various components illustrated in FIG. 3-5 are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams in FIGS. 6 to 8, 11 and 12 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the disclosed examples.

What is claimed is:

1. A method comprising:
   determining, by a processor of a computing system, whether a set of quantified metrics obtained from an execution of an application in a cloud computing system corresponds to an anomaly;
   upon determining that the set of quantified metrics corresponds to an anomaly, computing, by the processor, a feature vector of the anomaly based on the set of quantified metrics, wherein the feature vector is a numerical representation of a state of anomaly of components in the cloud computing system, including:
      determining a deviation of a metric of each component type of the components from a metric that represents a normal behavior of the component type, and
      determining a fraction of metrics based on the deviations of the metrics of the component types;
   identifying, by the processor, an action from a plurality of actions for addressing the anomaly based on at least one trained classifier, wherein the at least one trained classifier is a classifier trained by converting a metrics set of a previously observed anomaly to a previous feature vector, and
   creating a mapping using a distance metric to determine a distance between the previous feature vector to a result of performing an action for addressing the previously observed anomaly, wherein identifying an action from a plurality of actions for addressing the anomaly includes:
      for each of the plurality of actions, determining a likelihood that the respective action will solve the anomaly using the feature vector of the anomaly and a trained classifier associated with the respective action,
      computing a score for the respective action based on the determined likelihood that the respective action will solve the anomaly and a cost associated with performing the respective action, and
      based on the computed scores for the plurality of actions, selecting one of the plurality of actions as the action for addressing the anomaly.

2. The method of claim 1, wherein selecting one of the plurality of actions as the action for addressing the anomaly includes selecting at least one component type action and at least one component instance action,
   a component type action corresponding to an action performed on a component type of the cloud computing system, and
   a component instance action corresponding to an action performed on an instance of a component of the cloud computing system.

3. The method of claim 1, wherein the at least one trained classifier includes at least one trained component type classifier and at least one trained component instance classifier,
   a component type classifier being for computing a likelihood that a component type action solves an anomaly, and
   a component instance classifier being for computing a likelihood that a component type action solves an anomaly.

4. The method of claim 1, wherein selecting one of the plurality of actions as the action for addressing the anomaly includes:
   ranking the computed scores of the plurality of actions, and
   selecting an action having a highest ranking to address the anomaly.

5. The method of claim 1, wherein selecting one of the plurality of actions as the action for addressing the anomaly includes:
   selecting an action having a computed score with a highest likelihood of solving the anomaly at a minimum cost to be the action for addressing the anomaly.

6. The method of claim 1, wherein the at least one trained classifier is a classifier selected from the group consisting of K-nearest neighbor classifiers, support vector machine classifiers, and Bayesian network classifiers.

7. The method of claim 1, further comprising:
   evaluating the at least one trained classifier based on the result of performing the action for addressing the anomaly.

8. The method of claim 1, further including:
   determining whether addressing an anomaly requires training a classifier; and
   upon determining that the anomaly requires training a classifier, automatically training a classifier.

9. The method of claim 1, further including applying the identified action on the execution of the application in the cloud computing system.

10. The method of claim 1, further including recommending the identified action to a user.

11. A system for identifying an action for responding to an anomaly in the execution of an application in a cloud computing system, the system comprising:
    a processor; and
    a memory storing instructions that when executed by the processor cause the processor to:

determine whether a set of metrics obtained from the execution of the application corresponds to an anomaly, upon determining that the set of metrics corresponds to an anomaly, compute a feature vector of the anomaly based on the set of metrics, wherein the feature vector is a numerical representation of a state of anomaly of components in the cloud computing system, wherein to compute the feature vector of the anomaly, the instructions are to cause the processor to:

determine a deviation of a metric of each component type of the components from a metric that represents a normal behavior of the component type, and determine a fraction of metrics based on the deviations of the metrics of the component types;

identify, using at least one trained classifier, an action from a plurality of actions for addressing the anomaly, the at least one trained classifier is a classifier trained by converting a metric of a previously observed anomaly to a previous feature vector, and create a mapping using a distance metric to determine a distance between the previous feature vector to a result of performing the action for addressing the previously observed anomaly, wherein, to identify an action from a plurality of actions for addressing the anomaly, the instructions are to cause the processor to:

for each of the plurality of actions, determine a likelihood that the respective action will solve the anomaly using the feature vector of the anomaly and a trained classifier associated with the respective action, compute a score for the respective action based on the determined likelihood that the respective action will solve the anomaly and a cost associated with performing the respective action, and based on the computed scores for the plurality of actions, select one of the plurality of actions as the action for addressing the anomaly.

12. The system of claim 11, wherein to select one of the plurality of actions as the action for addressing the anomaly, the instructions are to cause the processor to:

rank the computed scores of the plurality of actions, and select an action having a highest ranking to address the anomaly.

13. The system of claim 11, wherein the instructions are to communicate the selected action to a client computer system.

14. The system of claim 11, wherein the at least one trained classifier includes: at least one trained component type classifier and at least one trained component instance classifier, wherein a component type classifier is associated with at least one component type action and a component instance classifier is associated with at least one component instance action.

15. A non-transitory computer readable medium comprising instructions that when executed by a processor cause the processor to:

determine whether a set of metrics obtained from an execution of an application corresponds to an anomaly; and upon determining that the set of metrics corresponds to an anomaly, compute a feature vector of the anomaly based on the set of metrics, wherein the feature vector is a numerical representation of a state of anomaly of components in the cloud computing system, wherein to compute the feature vector of the anomaly, the instructions are to cause the processor to:

determine a deviation of a metric of each component type of the components from a metric that represents a normal behavior of the component type, and determine a fraction of metrics based on the deviations of the metrics of the component types;

identifying an action from a plurality of actions for addressing the anomaly using at least one trained classifier, the at least one trained classifier is a classifier trained by converting a metric of a previously observed anomaly to a previous feature vector, and creating a mapping using a distance metric to determine a distance between the previous feature vector to a result of performing the action for addressing the previously observed anomaly, wherein, to identify an action from a plurality of actions for addressing the anomaly, the instructions are to cause the processor to:

for each of the plurality of actions, determine a likelihood that the respective action will solve the anomaly using the feature vector of the anomaly and a trained classifier associated with the respective action, compute a score for the respective action based on the determined likelihood that the respective action will solve the anomaly and a cost associated with performing the respective action, and based on the computed scores for the plurality of actions, select one of the plurality of actions as the action for addressing the anomaly.

16. The non-transitory computer readable medium of claim 15, wherein to select one of the plurality of actions as the action for addressing the anomaly, the instructions are to cause the processor to:

rank the computed scores of the plurality of actions, and select an action having a highest ranking to address the anomaly.

17. The non-transitory computer readable medium of claim 15, wherein to select one of the plurality of actions as the action for addressing the anomaly, the instructions are to cause the processor to:

select an action having a computed score with a highest likelihood of solving the anomaly at a minimum cost to be the action for addressing the anomaly.

18. The non-transitory computer readable medium of claim 15, wherein the at least one trained classifier includes:

a trained component type classifier and a trained component instance classifier, wherein a component type classifier is associated with a component type action and a component instance classifier is associated with a component instance action.

19. The non-transitory computer readable medium of claim 15, wherein to select one of the plurality of actions as the action for addressing the anomaly, the instructions are to cause the processor to:

select a component type action and a component instance action, wherein a component type action corresponds to an action performed on a component type of the cloud computing system, and a component instance action corresponds to an action performed on an instance of a component of a cloud computing system.

20. The non-transitory computer readable medium of claim 15, wherein the instructions are further to cause the processor to:

evaluate the at least one trained classifier based on the result of performing the action for addressing the anomaly.

* * * * *